United States Patent [19]

Mercurio et al.

[11] 4,023,977
[45] May 17, 1977

[54] ACRYLIC OLIGOMERS AS MELT FLOW MODIFIERS OF THERMOPLASTIC COATINGS AND POWDERS

[75] Inventors: Andrew Mercurio, Hatboro; Sheldon N. Lewis, Willow Grove, both of Pa.

[73] Assignee: Rohm and Haas Company, Philadelphia, Pa.

[22] Filed: May 7, 1975

[21] Appl. No.: 575,323

Related U.S. Application Data

[63] Continuation of Ser. No. 255,878, May 10, 1972, abandoned.

[52] U.S. Cl. .............................. 106/178; 260/17 R; 26/31.2 R; 428/439; 428/441; 428/461; 428/464; 428/535
[51] Int. Cl.² ..................... C08L 1/08; C08K 5/10
[58] Field of Search ............... 106/178; 260/15, 17, 260/8, 31.2 R; 428/535, 441, 439, 461, 464

[56] References Cited

UNITED STATES PATENTS 3,923,720  12/1975  Coaker et al. ................ 260/31.2 R

OTHER PUBLICATIONS

Industrial & Engineering–Chem. vol. 42, No. 3, "Creep Behavior of Plasticized PVC" Ali et al. pp. 484–488.

*Primary Examiner*—Theodore Morris
*Attorney, Agent, or Firm*—Harold L. Greenwald; Robert A. Doherty

[57] ABSTRACT

The application discloses a mixture of high molecular weight hard resins such as polymethyl methacrylate, cellulose acetate butyrate, and cellulose nitrate containing a minor proportion of a very viscous or solid oligomer of one or more vinyl monomers such as methyl methacrylate, ethyl methacrylate, isopropyl methacrylate, tertiary butyl methacrylate, isobutyl methacrylate, or tertiary butyl acrylate, which monomers when polymerized give a polymer which has a glass transition temperature calculated by the formula used for high molecular weight polymers to be at least 30° C., and preferably at least 50° C. The oligomers have a number averaging chain length of 4 to 25 mers. They have a narrow molecular weight distribution such that the ratio of the weight average molecular weight to the number average molecular weight is 2 or less, preferably less than 1.5. This ratio is referred to as the heterogeneity index. The oligomers are used to lower the melting point and improve the flow of the high molecular weight polymers and yet do this without excessively plasticizing the hard polymers to a point where they are noticeably softened at the use temperatures as contrasted with fluid oligomers and oligomers of "soft" monomers such as butyl acrylate, ethylhexyl acrylate, ethyl acrylate, octyl acrylate, and lauryl methacrylate. The mixture is useful for coatings applied in the form of a powder, solution, or dispersion. Molded and cast articles can also be made. As used herein, "thermoplastic" includes thermosetting resins which go through a thermoplastic flowable stage before becoming thermoset.

20 Claims, No Drawings

ACRYLIC OLIGOMERS AS MELT FLOW MODIFIERS OF THERMOPLASTIC COATINGS AND POWDERS

This is a continuation, of application Ser. No. 255,878 filed May 10, 1972 now abandoned.

This invention relates to the use of oligomers of addition polymerized monomers to lower the melting point and improve the flow of hard high molecular weight polymers. The blend is useful in coatings, for example. The oligomers are in solid form or in the form of viscous liquids at room temperature and are such that they do not appreciably reduce the hardness of products made of the high molecular weight polymers at the temperature at which the final article of manufacture is used.

In the prior art, it has been proposed to use liquid oligomers of monomers which give homopolymers of quite low Tg such as ethyl acrylate, n-butyl acrylate, 2-ethylhexyl acrylate, n-octyl acrylate, lauryl methacrylate, and the like, as well as some monomers which give polymers having a high Tg such as vinyl acetate, vinyl chloride, acrylonitrile, and styrene, but the polymerization conditions being such as to give oligomers which are quite fluid at room temperature. In all cases, such plasticizers function for the purpose they are intended, that is, to plasticize or make the hard high molecular weight polymers with which they are blended softer at room or use temperature. The difficulties encountered with the use of such plasticizing oligomers include problems with large amounts of dimers and trimers in the liquid which, particularly dimers, are volatile and provide difficulties in curing coatings or articles prepared from blends of the hard resins with the liquid oligomers. Even when purified, as by stripping under vacuum at an elevated temperature, in order to eliminate dimers, trimers, and monomer, such oligomers as are made, for example, from "soft" monomers such as butyl acrylate, ethyl hexyl acrylate, ethyl acrylate, octyl acrylate, and lauryl methacrylate have a decided softening and plasticizing effect at the use temperature for the final article.

It has now been found that low molecular weight oligomers having a sharp and narrow distribution of molecular weights and which have a calculated glass transition temperature (Tg) of at least 30° C., and preferably at least 50° C. can be used to modify high molecular weight hard resins or polymers so that the melt viscosity thereof is lowered, and the melt flow index is lowered, without adversely affecting the hardness of the high molecular weight polymers at the temperature at which the final product, e.g., coated article, is used. In other words, the hard, high molecular weight resin such as an acrylic or cellulose ester automobile lacquer are modified in such a way that the melt and flow properties are improved and yet the final lacquer coating is not plasticized to any appreciable extent, and thus retains the hardness of the modified coating resin. The manner of calculating Tg is explained below.

In the oligomer compositions of the invention, the oligomer has a number average chain length of about 4 to about 25 mers, and preferably of about 5 to about 15 mers. The narrowness of the molecular weight distribution is shown by the ratio of the weight average molecular weight to the number average molecular weight, hereinafter called the "heterogeneity index." This ratio, for the oligomers useful according to the invention, is 2 or less, preferably less than 1.5.

Depending upon the particular monomer which is employed, and the particular comonomer which may be employed, if any, the oligomer compositions of the invention will cover a range of molecular weights (weight average molecular weight, $\overline{M}w$) in the range of about 400 to about 2,500, and preferably about 500 to about 1500. The oligomers are viscous liquids or solids at 20° to 25° C. (room temperature) and are hard solids at −20° C. or below.

The calculated Tg of the oligomers of the invention is at least 30° C., preferably at least 50° C., as stated above. An example of such an oligomer is one of 30 percent butyl acrylate and 70 percent methyl methacrylate. One formula useful for calculating the Tg of a copolymer is that the reciprocal of the Tg of the copolymer is equal to the sum of the ratios of the weight proportion of each monomer, the total monomers being 1, to the Tg of a homopolymer of that monomer, in degrees Kelvin. The Tg values used are those previously determined for high molecular weight homopolymers, such as the values given by Burrell in an article titled "The Glass Transistion in Coating Formulations" in the February 1962 issue of the Official Digest. Thus, the co-oligomer of 30 percent butyl acrylate (high polymer Tg of −56° C.) and 70 percent methyl methacrylate (high polymer Tg of 105° C.) with the calculated Tg of the co-oligomer being about 35° C., would be suitable.

While the measured Tg of a low molecular weight oligomer is not the same as this value, the calculated value is used for convenience in defining the monomers and oligomers thereof which are useful in accordance with the invention. While the actual Tg of the oligomers can be measured, there is no need to do so. Generally, the actual Tg should be at least −20° C., preferably at least 5° C. As another example, using the above formula and Burrell's values, a high molecular weight copolymer ($\overline{M}w$ above 100,000) of 10 percent acrylic acid (Tg = 106° C., 379° K.) and 90 percent methyl methacrylate (Tg = 105° C., 378° K.) would be calculated to have a Tg of about 105° C. The actual value for a co-oligomer of these monomers in the same ratios and having and $\overline{M}n$ of about 550 to 600 with an $\overline{M}w$ of about 750 would be in the range of about 15° to 20° C. The same monomers in the same ratios but in a co-oligomer of $\overline{M}n$ of about 1,000 and $\overline{M}w$ of about 1,500, have an actual Tg of about +40° C. Another reason for using the calculated Tg is that it is difficult to determine Tg on low molecular weight oligomers, and still another is that the authorities are in relatively close agreement for the Tg values of a number of high molecular weight polymers.

Another essential requirement of the oligomers is that they do not appreciably detract from the hardness at room temperature (20° to 25° C.) of the high molecular weight resins modified therewith. Such hardness may be expressed as Knoop hardness or KHN. This value must be at least about 7, preferably at least 10.

In addition to homo-oligomers and co-oligomers, blends thereof can be used.

The term "vinyl monomer" as used herein means a monomer comprising at least one of the following groups:
vinylidene $CH_2=C<$,
vinyl $CH_2=CH-$, and
vinylene $-CH=CH-$, whether homo-oligomerizable or not. "Vinyl polymer" is used to mean an addition polymer of such monomers. Examples are the α,β-ethylenically unsaturated monocarboxylic acids and esters and amides thereof, α,β-ethylenically unsaturated aldehydes, α,β-ethylenically unsaturated dicarboxylic acids and esters, amides, half esters, and half amides thereof, α,β-ethylenically unsaturated nitriles, hydrocarbons such as vinylaryl compounds, vinyl halides, vinyl acyloxy compounds (esters of saturated carboxylic acids and ethylenically unsaturated alkanols), vinyl amines and salts thereof, vinyl ureido monomers, vinyl compounds having heterocyclic nitrogen-containing (HN<) groups, and halogen, hydroxyalkyl, or aminoalkyl substituted derivatives thereof, whether homo-oligomers or co-oligomers.

Specific examples of suitable monomers which may be oligomerized for use according to the invention are the unsaturated acrylic acid and methacrylic acid monomers and esters thereof with alkanols having 1 to 20 carbon atoms, such as methanol, ethanol, butanol, pentadecanol, and the like, acrolein, methacrolein, ethylene, propylene, isobutene, butadiene, isoprene, chloroprene, styrene, vinyl toluene, vinyl chloride, vinyl bromide, vinyl acetate, vinyl propionate, the vinyl pyridines, primary amino compounds such as β-aminoethyl vinyl ether, aminopentyl vinyl ether, secondary amino-containing compounds such as secondary amyl t-butyl aminoethyl methacrylate, and the allied amine salts such as the chloride or hydroxide, ureido monomers such as are disclosed in U.S. Pat. Nos. 2,881,155 to Hankins, 3,300,429 to Glavis and Keighly, and 3,356,627 to Scott, examples being β-ureidoethyl acrylate, β-(N,N'-ethyleneureido)ethyl acid maleate, β-ureidoethyl vinyl ether, N-vinyl-N,N'-ethyleneurea, N-vinyloxyethyl-N,N'-ethyleneurea, N-methacrylamidomethyl-N,N'-ethyleneurea, and N-dimethylaminoethyl-N'-vinyl-N,N'-ethyleneurea, β-hydroxyethyl methacrylate, N-hydroxyethylacrylamide, N-methylolacrylamide, and N-(dimethylaminoethyl)acrylamide.

As is described below, these vinyl monomers include the acids mentioned above and esters thereof, as well as known "soft" and "hard" monomers.

The hard acrylics (homopolymers thereof give a high Tg) may be represented by the formula

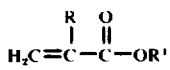

wherein R is H or alkyl having 1 to 4 carbon atoms. R¹ is preferably alkyl and is methyl or alkyl having from about 16 to about 20 carbon atoms when R is H, and is alkyl of from 1 to 4 carbon atoms or alkyl of from about 18 to about 20 carbon atoms when R is methyl. It can be seen from above that for alkyl acrylates and alkyl methacrylates the Tg at first decreases with an increased chain length of the alkyl group and then the Tg again increases; i.e., both hard and soft monomers are known to occur in each group of monomers. Examples of high molecular weight polymers of these hard monomers and of other hard monomers include:

| Homopolymer | Tg of Homopolymer (high M.W.) |
|---|---|
| poly (vinyl acetate) | 30° C. |
| poly (n-octadecyl styrene) | 32 |
| t-butylaminoethyl methacrylate | 33 |

-continued

| Homopolymer | Tg of Homopolymer (high M.W.) |
|---|---|
| poly (n-hexadecyl acrylate) | 35 |
| poly (n-propyl methacrylate) | 35 |
| poly (tert-butyl acrylate) | 43 |
| poly (vinyl acetate) (40 percent hydrolyzed) | 44 |
| poly (vinyl butyral) | 50 |
| poly (vinylpyrrolidone) | 54 |
| poly (2-hydroxyethyl methacrylate) | 55 |
| poly (vinyl chloride acetate) | 59 |
| poly (tetrafluorethylene) | 61 |
| poly (ethyl methacrylate) | 65 |
| poly (isopropyl methacrylate) | 81 |
| poly (decamethylene glycol dimethacrylate) | 82 |
| poly (vinyl chloride) | 82 |
| poly (vinyl carbazole) | 84 |
| poly (indene) | 85 |
| poly (vinyl alcohol) | 85 |
| poly (styrene) | 100 |
| poly (methyl methacrylate) | 105 |
| glycidyl methacrylate | 105 |
| poly (acrylic acid) | 106 |
| poly (tert-butyl methacrylate) | 107 |
| poly (acrylonitrile) | 110 |
| poly (isobornyl methacrylate) | 114 |
| poly (ethylene glycol dimethacrylate) | 132 |
| phenyl methacrylate | 110 |

Wherever "calculated" Tg is mentioned herein, these represent the Tg value used. As indicated above, these values are also used for calculating the Tg of co-oligomers.

As is known, for a given number of carbon atoms is the alcohol moiety, the extent and type of branching markedly influences the Tg, the straight chain products giving the lower Tg. Unless otherwise stated, Tg is in ° C.

As is apparent, an important property of the oligomer is the Tg thereof and consequently the selection of monomers and proportions thereof depends upon their influence on the Tg. The calculated Tg of the oligomer must be above 30° C., preferably above 50° C. (i.e., it must give a hard product). Tg is a conventional criterion of polymer hardness and is described by Flory, "Principles of Polymer Chemistry," pp. 56 and 57 (1953), Cornell University Press. See also "Polymer Handbook," Brandrup and Immergut, Sec. III, pp. 61 to 91, Interscience (1966). Tg may be calculated as described by Fox, Bull. Am. Physics Soc. 1, 3, p. 123 (1956), and as described above.

Optional monomers, utilized (if at all) in a minor proportion, are one or more resiliency-imparting or soft monomers which may be represented by the following formula

wherein R is H or alkyl having 1 to 4 carbon atoms. R³ is the straight chain or branched chain radical of a primary or secondary alkanol, alkoxyalkanol or alkylthiaalkanol, and having up to about 14 carbon atoms, examples being ethyl, propyl, n-butyl, 2-ethylhexyl, heptyl, hexyl, octyl, propyl, 2-methylbutyl, 1-methylbutyl, butoxybutyl, 2-methylpentyl, methoxymethyl, ethoxyethyl, cyclohexyl, n-hexyl, isobutyl, ethylthiaethyl, methylthiaethyl, ethylthiapropyl, n-octyl, 6-methylnonyl, decyl, dodecyl, and the like, said radicals $R^3$, when alkyl, having from 2 to about 14 carbon atoms, preferably from 3 to 12 carbon atoms, when R is H or methyl. When R is alkyl and $R^3$ is alkyl, $R^3$ should have from about 6 to about 14 carbon atoms and when R is H and $R^3$ is alkyl, $R^3$ should have from about 2 to about 12 carbon atoms, in order to qualify as a soft monomer.

One method of preparing the oligomers is by anionic polymerization. The anionic polymerization reaction may be carried out in the presence of an alkoxide anion, which serves as a catalyst, and an alcohol, which serves as a chain-regulating agent, as taught by U.S. patent application Ser. No. 137,057, filed Apr. 23, 1971, having the same assignee as the present application.

Other known methods of producing low molecular weight polymers may be utilized such as the use of a high proportion of a free radical catalyst, the use of a high polymerization temperature, the use of a chain transfer agent, or all of these together. Among the chain transfer agents are carbon tetrabromide, allyl chloride, thio-$\beta$-naphthol, thiophenol, butylmercaptan, ethylthioglycolate, mercaptoethanol, isopropylmercaptan, and t-butylmercaptan. When free radical catalysts are utilized, the concentration can be increased to a point where the molecular weight is reduced substantially, particularly with high reaction temperatures. For example, utilizing benzoyl peroxide or di-t-butyl peroxide in amounts of from .5 mole percent to 5 mole percent based on monomer, along with a solvent such as isopropyl benzene, and utilizing reaction temperatures of 110° to 250° C. gives low molecular weight polymers. The polymerization processes can be solution, bulk, emulsion, or a nonaqueous dispersion. In addition to the anionic polymerization and free radical polymerization processes, cationic polymerization may be conducted at high temperatures or in the presence of high levels of initiators or chain transfer agents. Degradative processes may be used to produce the oligomers from high polymers such as by mastication, photochemically induced degradation, oxidation, bombardment with high energy radiation such as x-rays, gamma rays, and high energy electrons. In cases where the products have a wide molecular weight distribution, it is necessary to obtain the narrow molecular weight distribution fraction suitable for use in accordance with the invention. This can be done by vacuum distillation, zone refining, selective precipitation, selective crystallization, solvent extraction, or other known methods. It is, of course, much preferred to use a process which initially gives the narrow distribution of molecular weights such as illustrated in the examples herein.

Conventional systems for coating substrates such as metals, glass, wood, etc. comprise utilizing the polymers dissolved or dispersed in liquids. The processes involving liquids have a number of disadvantages including air pollution by solvent vapors, the added cost of using the solvent as a carrier for the polymer, the ventilation and fire hazard problems, toxicity, viscosity problems requiring the use of a low solids content and the necessity to use repeated coatings to obtain a given film thickness, and so forth. Many polymers with desirable coating properties have not been successfully applied from solvent systems because of incompatibility, or insolubility, examples being the nylons, polyolefins, chlorinated polyethers, and fluorocarbons. The present invention is useful with such methods, but powder coating is particularly preferred.

Powder coating avoids such problems, and may be defined as any process which will deposit an essentially solventless powder which is capable of being fused or cured into a coherent, protective, and durable coating, upon any substrate, particularly conductive substrates. The powder coatings, particularly those applied to substrates which have a difference in electrostatic charge from the powder, have the advantage of providing excellent uniformity of coatings, even over edges and corners, with no sagging, orange peel, or drip marks present. The principal commercial powder coating methods are the fluidized bed coating method, the electrostatically charged fluidized bed, and the electrostatic spray or cloud methods. Fluidized bed coating is based upon dipping a preheated object into a bed of finely divided dry coating materials, often with a post-heating step to provide a smooth coating. Coatings of 5 to 50 mils can readily be obtained in this method. The electrostatic fluidized bed, spray, or cloud method normally involves providing a charge upon the particles, although the object to be coated can also be charged, followed by exposing the substrate, commonly grounded, to the mist, spray, or cloud of powdered coating resins. Usually the particles are supplied with a negative charge, although some materials such as the nylons are most useful with a positive charge. With resins which retain the charge for a long period of time, it is possible to obtain a very thin layer or coating because the layer of powder on the metal retains the charge and tends to repel additional powder particles. Uniform coatings of as low as about 1 mil are possible utilizing this method and up to 10 to 20 mils or more are also possible. Examples of polymers which retain a charge of static electricity which is bled off slowly are the epoxies, the cellulosics, and the nylons. Others lose their charge quite rapidly, the vinyl resins being an example, permitting rapid build-up of heavy layers of powder. Such powders may make it advisable to utilize a preheated object to obtain the necessary fusion of the powdered composition.

Some of the problems involved with powder coatings is that in order to achieve the necessary flow of the polymers, temperatures high enough to char the polymer, prematurely crosslink in the case of thermosetting resins, discolor the polymer, and cause other damage to the polymer are commonly necessary. While external plasticizers are a partial solution to these problems, many plasticizers are not useful for powder coatings in that they tend to cause the particles to stick together or they may exude or be extracted from the coating on the finished article, or they may unduly soften the coating resin at the temperature of use of the coated article.

While the powder coating can be applied directly to a degreased conductive surface, a primer is often useful, commonly increasing the peel strength of the coating resin. One such primer is an acid selected from the group consisting of butyl phosphoric acid, pyromellitic acid, trimesic acid, dimethyl ester of pyromellitic acid, phosphoric acid, and tetrachlorophthalic acid, applied in a solvent and the solvent then removed by evaporation with heat. Such acids may be mixed with the powder in some cases, as taught by U.S. Pat. No. 3,037,955, to E. V. Carman. Other suitable primers are well known, an example being one recommended by Eastman Chemical Products, Inc. as a base for cellulose acetate butyrate powder coatings as follows:

| Ingredient | Percent By Weight |
|---|---|
| Half-Second Cellulose Acetate Butyrate | 15 |
| Half-Second Cellulose Acetate Butyrate/TiO₂ Pigment Grind, 40:60 | 5 |
| Methylon 75121 (60% solids)* | 10 |
| Acryloid B-82 (40% solids)** | 15 |
| Dioctyl Phthalate | 5 |
| Toluene (Toluol) | 30 |
| Methyl Isobutyl Ketone (MIBK) | 10 |
| Isopropyl Alcohol | 5 |
| Methyl Isoamyl Ketone (MIAK) | 5 |

*General Electric Company, 111 Plastics Avenue, Pittsfield, Massachusetts 01203; condensation products of substituted aromatic hydrocarbons and formaldehyde.
**Rohm and Haas Company, Independence Mall West, Philadelphia, Pennsylvania 19105; lower alkyl polyacrylate.

Other well-known and commercially available primers are useful.

Various solvents may be employed in applying the primer, such as toluene, xylenes, acetone, methyl ethyl ketone, methyl isobutyl ketone, methyl isopropyl ketone, amyl alcohol, 2-ethoxyethyl acetate, ethyl acetate, butyl lactate, amyl acetate, methyl acetate, denatured ethyl alcohol, isopropanol, diacetone alcohol, cyclohexanol, ethylene dichloride, diisobutyl ketone, cyclohexanone, 2-butoxyethanol, furfural, petroleum naphtha boiling in the range of about 87° to about 145° C., cyclohexane, hexane, aromatic hydrocarbon mixtures, such as "Solvesso 150," and also various aliphatic, naphthenic and aromatic naphthas. Mixtures of such solvents are generally useful. Powder coating primers are also useful.

Among the high molecular weight resins which may be modified by the oligomers of the invention are the alkyds including the drying or non-drying oil-modified alkyds, rosin-modified alkyds, mixed or co-reactive alkyds and epoxy resins, mixed or co-reactive alkyd-/aminoplast/epoxy resins, mixed or co-reactive epoxidized esters of higher fatty acids with aminoplast resins, cellulose esters such as cellulose nitrate, cellulose acetate butyrate, cellulose acetate, and cellulose acetate propionate; nylons such as nylon 11 and nylon 12; epoxies such as the linear polymers derived from epichlorohydrin and bisphenol A and the epoxy acrylates; polysulfides, acetal polymers, polycarbonates, polysulfones, polyphenylene oxide, polyimides, polyxylenes, silicones such as the polymer having repeating dimethylsilicone units; polyolefins such as polystyrene; hard acrylics such as copolymers of 40 to 99.5 percent methyl methacrylate with another acrylic acid or methacrylic acid ester, and optionally, up to 50 percent of functional monomers containing amine, amide, carboxyl, hydroxy, or other known functional groups which may promote compatibility or adhesion, mentioned heretofore; chlorinated polyethers; polyhaloolefins such as polytetrafluoroethylene, polyvinyl chloride; polyesters such as the unsaturated polyester derived from maleic anhydride, phthalic anhydride, and ethylene glycol; and so forth. The hard coating resins are well known for powder coatings; the present invention being to modify them with the melt viscosity reducing component so that smooth uniform coatings can be obtained at a lower temperature than normal fusion temperature.

Representative high molecular weight resins will now be described. These can be used alone or in admixture with other high molecular weight resins.

Cellulose acetate butyrate is representative of the cellulose esters. It preferably has 16 to 40 percent of the hydroxyl groups in a glucose unit esterified with butyric acid and from 10 to 30 percent of such hydroxyl groups esterified by acetic acid. In the following specification, this is referred to as a cellulose acetate butyrate containing 16 to 40 percent butyryl and 10 to 30 percent acetyl. For some uses it is preferred that this ester contains 24 to 28 percent butyryl and 19 to 22 percent acetyl. The molecular weight of the cellulose ester should be such that when viscosity is determined on a 20 percent solution in a 90:10 acetone/ethanol mixture at 25° C. on a falling ball viscometer (ASTM D-1343-54T), the viscosity will be in the range from ½ to 5 seconds and preferably from ½ to 3 seconds, using a 5/16-inch steel ball falling through 10 inches in a 1-inch tube. This specification of molecular size of the cellulose acetate butyrate is commonly used in the industry and simply identifies the cellulose acetate butyrate as having a ½-second, a 5-second, or an intermediate viscosity. If the butyryl content is too high, it has been found that the compositions are too tacky for certain uses. On the other hand, when the butyryl content is too low, the coating has insufficient elasticity. In other uses, as in the cases where no flexing occurs, a cellulose acetate butyrate, having 12 to 14 percent acetyl and 35 to 39 percent butytyl, and a degree of substitution of about 2.7 is perfectly satisfactory.

The usual commercial cellulose nitrate, having a DS (degree of substitution) of about 1.9 to 2.3, a DP (degree of polymerization) of about 100 to 400, and about 10 to 12 percent nitrogen is useful in accordance with the invention.

Substantially any compatible hard acrylic coating resin having a Tg of from about 50° C. to about 110° C. or higher, preferably at least 65° C., is useful according to the invention. The hard acrylic monomers, those which when homopolymerized give a high Tg, include the lower alkyl ($C_1$–$C_4$) methacrylates, the higher alkyl ($C_{14}$–$C_{20}$) acrylates, acrylic acid, methacrylic acid, itaconic acid, tertamyl methacrylate, cyclohexyl acrylate or methacrylate, tertiary butyl acrylate, isobornyl methacrylate, benzyl acrylate and phenoxyethyl methacrylate. The soft acrylic or other monomers, or those which when homopolymerized give a low Tg, include the higher alkyl ($C_5$–$C_{15}$) methacrylates, the lower alkyl ($C_1$–$C_{13}$ alkyl) esters of acrylic acid, vinylidene chloride, ethyl thiaethyl methacrylate, and others, all as is more particularly described in U.S. Pat. Nos. 3,020,178; 2,972,592; and 2,795,564. As is known in the art, chain branchng affects the Tg; the greater the branching the higher the Tg, in general. All or part of the hard acrylic monomer may be replaced by other ethylenically unsaturated hard monomers such as styrene, vinyltoluene, acrylonitrile, methacrylonitrile, vinyl acetate, or vinyl chloride. Blends of hard and soft monomers are useful in accordance with known procedures. Functional adhesion promoting monomers, including α,β-unsaturated carboxylic acids, such acrylic acid, methacrylic acid, itaconic acid, aconitic acid, maleic acid, half esters of the dicarboxylic acids such as maleic acid, fumaric acid, the dimer or trimer of methacrylic acid, acrylamides such as acrylamide, methacrylamide, N-methylolacrylamide, N-methacrylamide, and N-ethylolacrylamide, are permissible in the coating resin.

These polymers and the other powder coating polymers are well known to the art.

While most of the coating resins described heretofore are thermoplastic, thermosetting resins such as the epoxies, the aminoplast-modified alkyds, and others are useful.

While, for certain purposes, a clear coating may be employed, it is quite general to include pigments in an amount up to 100 percent by weight of the polymer in the powder coating compositions. Examples of suitable pigments include titanium dioxide, carbon black, iron blues, phthalocyanine blues and greens; metal oxides, hydroxides, sulfides, sulfates, silicates and chromates; organic maroons, aluminum flake, bronze powders, pearl essence, and various fillers or extenders such as talc, barytes, china clay and diatomaceous earth. It will be obvious to those skilled in the organic coating art that the amount of pigment may be varied widely, depending on the effect desired. The amount of pigment, by weight based on the weight of the organic film-forming material, may vary between about 2 percent for light, high-hiding pigments, such as carbon black, and about 100 percent for heavy, low-hiding pigments such as lead chromate. The method of dispersing the pigment in the powdered resins is not critical provided a uniform dispersion is produced. The pigment may be present as separate particles or may be dispersed in either the coating resin particles or the melt flow reducing polymer particles of the invention, preferably the latter.

The powder particles are produced by various methods such as cryogenic grinding, ball milling, spray drying of latices, solutions, or non-aqueous dispersions, precipitation from solution, and so on. In fusing the coating, temperatures of from about 180° to 500° C. are useful. With the thermosetting resins and the use of a catalyst, even lower temperatures are sometimes useful.

The hard coating resin, the oligomer, the pigment, and other materials used in the powder coating are desirably about 10 to about 500 microns, preferably 50 to 250 microns, in cross-section, and most desirably spherical in shape. The powder must be free-flowing and be resistant to sintering to form agglomerates at the temperatures used. The final composition can be prepared either by dry-blending or melt-mixing, or solution mixing. As has been suggested heretofore, the hard powder coating resins per se form no part of the present invention, the invention being in modifying the same with the oligomer so that the combination has a low melt viscosity and is fused, with the formation of a uniform film, at a reasonably low temperature and a narrow temperature range. Useful temperatures depend upon the identity of the hard coating resin and the amount and identity of the melt flow reducing additive utilized, as well as the presence or absence of external plasticizers.

Substantially any substrate is useful. Thus, metals, wood or paper, glass, glass made conductive by a tin oxide coating, and so forth, are suitable.

The following examples will further illustrate the invention and the preparation of suitable oligomers, but are not intended to limit it in any way. All parts are by weight and all temperatures are in degrees Centigrade, unless otherwise noted.

EXAMPLE 1

Homopolymerization of Methyl Methacrylate

Method A

This example shows a typical homopolymerization of an ester of methacrylic acid according to the "batch-type" polymerization process.

A clean, dry 3-neck flask equipped with mechanical stirrer, condenser and thermometer in a Y-arm side inlet, under dry nitrogen, is charged with commercially pure methyl methacrylate monomer, inhibited with 10 ppm of phenothiazine or dicyclohexyl phenylene diamine. The stirred solution is heated; upon warming to 60° C., it is charged with 0.6 mole percent sodium methoxide and 3.0 percent methyl alcohol (added as a 25 weight percent solution in methyl alcohol). The cloudy white mixture is heated to 93° C. over a 6-minute period and as the 75° to 80° C. temperature is passed, methanol addition in aromatic solvent (xylene, toluene) is started via the side arm inlet at the rate of 0.35 mole percent per minute for a period of 33 minutes (to a total of 15 mole percent methyl alcohol addition). The gradually thickening and clearing solution is maintained at 93° ± 1° C. with stirring for an additional 2 hours. Xylene or toluene are added as diluents as needed for viscosity control. Analysis of the product solution by gas-liquid chromatography upon completion of the reaction time discloses <2 percent of residual methyl methacrylate and a trace (<0.1 percent) of methyl alcohol. Dimer and trimer levels are <3 to 4 and <8 to 10 weight percent, respectively, by quantitative gas-liquid chromatography and are confirmed by gel permeation chromatography. The yellow to yellow-orange mixture is cooled to 60° C., the basic moieties are quenched with acid (acetic, formic, HCl, $H_2SO_4$) removing essentially all color, and 1 weight percent of a suitable filter aid is dispersed and stirred for 5 to 10 minutes. Pressure, or aspirator filtration results in greater than 94 weight percent recovery of a clear, colorless to light straw solution of methyl methacrylate polymer. Analysis by gel permeation chromatography shows symmetrical weight distribution around 700 to 900 M.W., with >85 weight percent in the range of 300 to 1200. Unsaturation determination with solvent-stripped product typically shows less than 0.07 meq./g.

Similar procedures with differing methyl alcohol addition rates at constant catalyst level and 93° C. gives the product distribution in Table I.

Table I

| Methyl Alcohol Addition Rate (Mole %/Min.) | Total Alcohol Level (Mole % of Methyl Methacrylate Charged) | Product Appearance and Molecular Weight Distribution* |
|---|---|---|
| 0.45 | 20 | Oil; 300~900 |
| 0.30 | 12–13 | Syrup; ~400–1500 |
| 0.20 | 11 | Semi-Solid; 600~1600 |
| 0.10 | 8–9 | Brittle Solid M.P. >40° C.; 800~3000 |
| 0.05 | 7 | Brittle Solid M.P. ~50–80°; 1000~4000 |
| None | 3 | Brittle Solid M.P. ~50–80°; 1000~10,000 |

*>85 percent of the product weight contained in the limits specified; by gel permeation chromatography.

Method B

This example shows a typical homopolymerization of an ester of methacrylic acid according to a gradual addition polymerization process.

To the apparatus described in Method A is charged 1.0 to 1.2 mole percent (based on monomer to be subsequently added) of powdered potassium tert-butoxide or methoxide to enough toluene or xylene diluent to form a stirrable slurry. A solution of methyl methacrylate containing 15 mole percent methyl alcohol, neat or in ca. 10 weight percent toluene or xylene for viscosity control, is added dropwise to the stirred catalyst slurry at 65° C., at a rate sufficient to maintain reaction (added at 1.3 to 1.5 percent per minute for the first half of addition and ca. 1.0 percent per minute for the second half). The mixture readily takes on the pale yellow color of carbanion species and the viscosity increases within several percent of first addition. Aliquots taken during and following monomer/alcohol addition establish that high conversion polymerization, with M.W. distribution essentially constant, occurs throughout the addition period, that <10 percent residual monomer remains at the completion of addition, and that a short holding time at 65° C. reduced monomer levels to ca. 2 percent.

Following a 20 to 30 minute hold, the nearly clear, yellow oil is cooled to 60° C., quenched with 1.0 to 1.2 percent acetic acid (removing almost all color), treated with 1 weight percent filter aid and vacuum filtered at 60 to 80° C. Gel permeation chromatography of the clear, colorless to light straw colored oil discloses the major weight fraction to be ca. 1200, with 90 weight percent spread between 300 and 2600. Lower methyl alcohol levels yielded successively higher molecular weight products (Table II).

Table II

| Methyl Methacrylate Polymerization, Gradual Addition Process at 65° C. | |
|---|---|
| Methyl Alcohol Level | Product Mw (and 90 Wt. % Distribution) |
| 20% | 11–1200 (300–2500) |
| 16 | 1200 (300–2600) |
| 12 | 16–1700 (350–3500) |
| 10 | 1800 (350–4000) |

Method C

This example shows a typical homopolymerization of an ester of methacrylic acid according to the two-stage polymerization process.

To the apparatus described in Method A is charged 2.24 g. (20 mole, 1.0 mole percent based on total monomer) of powdered potassium tert-butoxide and ca. 10 g. xylene to form a stirrable slurry. Monomer solution (a) is prepared with 80 g. (0.80 mole, 40 percent of total monomer) methyl methacrylate, inhibited with 3 ppm dicyclohexyl phenylene diamine and 9.6 g. (0.30 mole, 37.5 mole percent of the initial methyl methacrylate charge, 15 percent of total monomer) anhydrous methanol; solution (a) is added over a 30 to 45 minute period to the stirred catalyst slurry at 60 to 65° C. The exotherm observed during the early stages of addition subsides and reaction temperature is maintained throughout addition and for a 45 minute post-addition hold. The reaction mixture is a mobile, hazy orange-yellow liquid containing 5 to 10 percent of free methyl methacrylate and 90 to 95 percent as dimer through ca. hexamer ($n = 2$ to 6).

Monomer solution (b), consisting of 120 g. (1.20 mole, 60 percent of total monomer charge) methyl methacrylate and 25 g. xylene, is added dropwise over a 1 hour period at 60° to 65° C. Exotherm occurs throughout this addition; gas-liquid chromatography of reaction aliquots disclose monomer levels <1 percent and gel permeation chromatography indicates polymer growth paralleling addition. The hazy orange syrup (viscosity ca. 300 cps at 65° ) is held at this temperature for 15 minutes, reducing methyl methacrylate level to nil; catalyst is then quenched with 1.2 g. (20 mole) acetic acid. One gram of a filter aid is added to the nearly colorless syrup and dispersed with stirring for 5 to 10 minutes.

Aspirator filtration of the warm oil through a steam-heated Buchner funnel affords the product as a clear, light straw to colorless syrup in <98 percent recovery. Gel permeation chromatography discloses $\bar{M}w \sim 720$ to 750, with the distribution 300 to 1300.

When 20 mole percent methyl alcohol is used in the above procedure, polymer is obtained in greater than 95 percent yield with $\bar{M}w$ ca. 620, spread from 250 to 1100.

Preparations made with initially soluble sodium methoxide are also successful, and require approximately 4 to 5-fold longer reaction times for 95 percent conversion at 90° to 93° C., resulting in reaction rates which do not parallel monomer addition rates. Catalyst precipitation occurred with monomer addition and conversion. Gel permeation chromatography discloses a similar $\bar{M}w$, at 750 to 800 with a slightly broader distribution, 300 to 1600.

EXAMPLES 2 to 19

Preparation of Methacrylate Homopolymers and Copolymers

Following the procedures of Example 1, a wide variety of methacrylate homopolymers and copolymers are prepared. Table III summarizes the polymerization conditions and properties of some typical polymers useful in the invention.

Table III

| Example | Monomer(s)[1] | Methacrylate Hommo- and Co-Oligomers | | | | Chain Length[7] |
|---|---|---|---|---|---|---|
| | | Method[2] | Alcohol Level[3] | $M_w/M_n$[5] | Product $M_n$[5] | |
| 2 | MMA | A (93°) | 18% (0.35) | 1.2 | 700 (300–1100)[6] | 6–7 (3–11) |
| 3 | MMA | A (93°) | 15% (0.3) | 1.2 | 750 (300–1600)[6] (80%, 400–1300) | 7 (3–16) |
| 4 | MMA | A (93°) | 8% (0.1) | 1.4 | 1600 (500–2500) | ~16 (5–25) |
| 5 | MMA | B (65°) | 12% | 1.9 | 1600 (400–3300) (80%, 430–2500) | ~16 (4–33) |
| 6 | MMA | B (80°) | 16% | 1.7 | 1200 (300–2400)[6] | ~12 (3–24) |
| 7 | MMA | B (100°) | 15% | 1.7 | 1600 (400–2500) | 16 (4–25) |
| 8 | EMA | B (75°) | 15% | 1.8 | 1600 (350–6500) | 14 (3–60) |
| 9 | MMA | C (65°) | 15% | 1.18 | 750 (300–1600) (80%, 430–1300) | 7–8 (3–16) |
| 10 | MMA | C (65°) | 20% | 1.2 | 620 (250–1100)[6] | 6 (2.3–11) |
| 11 | MMA | C (93°) | 15% | 1.2 | 800 (300–1600)[6] | 7–8 3–16) |
| 12 | 80 MMA/20 BMA | A (93°) | 15% (0.35) | 1.2 | 1000 (3500–1800)[6] | 9 (3–16) |

Table III-continued

| Example | Monomer(s)[1] | Method[2] | Methacrylate Hommo- and Co-Oligomers | | | Chain Length[7] |
| | | | Alcohol Level[4] | $M_w/M_N$[5] | Product $M_N$[5] | |
|---|---|---|---|---|---|---|
| 13 | 90 MMA/10 BMA | A (93°) | 13% (0.3) | 1.2 | 950 (350–2000) | — |
| 14 | 50 MMA/50 EMA | A (93°) | 11% (0.2) | 1.2 | 1100 (400–2200) | 9–10 (4–18) |
| 15 | 50 MMA/50 DMAEXA | A (67°) | 8%[11] (0.1) | — | — | — |
| 16 | 72 MMA/28 DMAEXA | B (67°) | 12% | 1.8 | 1300 (300–2600)[6] | ~11 (3–21) |
| 17 | 77 MMA/23 LMA | A (93°) | 13% (0.3) | 1.2–1.3 | 1100 (400–2500) | ~8 (2–18) |
| 18 | 68 MMA/32 t-BAEMA | B (80°) | 12% | 2 | est. 1800 (400–3500) | est. 14 (3–27) |
| 19 | 75 MMA/25 i-IMA | B (95°) | 5% | 2 | 1400 (400–3000) | 13 (4–27) |

[1]The following abbreviations are used:
MMA = methyl methacrylate
EMA = ethyl methacrylate
BMA = butyl methacrylate
DMAEMA = dimethylaminoethyl methacrylate
t-BAEMA = t-butylaminoethyl methacrylate
LMA = lauryl methacrylate
i-BMA = isobutyl methacrylate

[2]A = Method A in Example 1; B = Method B in Example 1; C = Method C in Example 1; reaction temperature in °C in parentheses.

[4]Method A, total mole percent alcohol on monomer (added at the indicated mole percent/minute); Method B, mole percent alcohol on monomer; Method C, on total monomer, added in first stage.

[5]Weight average molecular weight ($M_w$) and number average molecular weight ($M_N$) as determined by standardized gel permeation chromatography based on methyl methacrylate oligomer calibration (>90 weight percent included in the M.W. distribution listed parenthetically); 80 percent distribution given in several typical examples.

[6]The lower $M_w$ oligomers (i.e., those of $M_w$<1300) contain ca. 4 to 8 weight percent oligomer fractions under M.W. 400.

[7]Determined as in footnote 5.

[11]Dimethylaminoethanol used as alcohol.

EXAMPLE 20

Solvent borne lacquers based on a thermoplastic acrylic resin are formulated as follows, using respectively as modifiers, the methyl methacrylate oligomer of Example 2 and a conventional plasticizer exemplifying prior art. This latter plasticizer is a low molecular weight polyester ($\overline{M}w \approx 1000$), specifically a poly(ethylene adipate/phthalate) terminated with n-octyl to n-decyl alcohols. The acrylic resin of this example is a random copolymer of monomeric composition MMA/i-BMA/MAA = 84/15/1 weight ratio and is of molecular weight $\overline{M}w \approx 90,000$.

A rutile titanium dioxide pigment dispersion is prepared on a laboratory version of a Sherwin-Williams miniature sand mill according to the recipe:

| | Parts by Weight |
|---|---|
| Rutile TiO$_2$ | 100.0 |
| acrylic resin | 10.0 |
| xylene | 66.5 |
| Cellosolve acetate | 22.5 |
| 20–30 mesh Ottowa sand | 200.0 |

After grinding the above mixture for 15 minutes, the pigment dispersion is recovered from the sand via filtration through a fine varnish filter. The pigment dispersion is then mixed with additional acrylic resin, the aforementioned oligomeric acrylic modifier or the polyester plasticizer, and with solvents to yield suitably low viscosity for spray application:

| Formulation | | 20A | 20B |
| | | Parts by Weight | |
|---|---|---|---|
| pigment dispersion | | 85.7 | 85.7 |
| acrylic resin (predissolved in solvents below) | | 65.7 | 65.7 |
| oligomer of Example 2 | | 30.0 | — |
| polyester plasticizer | | — | 30.0 |
| toluene | | | |
| acetone | 4/4/2 wt. ratio | 478.4 | 478.4 |
| Cellosolve acetate | | | |

Solids content of the above lacquers is about 21 percent by weight and viscosity is approximately 11 seconds using the No. 4 Ford Cup.

The preceding lacquers are applied to steel panels with a DeVilbiss Model P-MBC-510 spray gun. Approximately 10–12 coats of lacquer are applied to achieve a final dry film thickness of 2.0 to 2.2 mils. After a force drying at 180° C. for 15 minutes, the coating is sanded with No. 600 abrasive paper to simulate a repair operation to remove any surface imperfections such as lacquer drips and runs. The coating is then rebaked at higher temperatures, 250° F. and upwards for 30 minutes, to determine the temperature required for reflow, that is, to cause the dull, sanded coating surface to flux to a surface smoothness and gloss reminiscent of that prior to sanding. Surface hardness characteristics of the films are also determined, both at ordinary ambient (77° F.) and at elevated temperatures (120° F.+) as would be encountered in many application areas, such as those involving exterior exposure to the elements. The 77° F. test is conducted with the Tukon Microhardness Tester (Wilson Mechanical Instrument Co.) which yields a quantity, the Knoop Hardness Number, which increases with increase in coating hardness. The higher temperature tests are of a qualitative nature and involve observing the relative degree of imprinting (none, moderate, severe, etc.) of the film by a piece of cheesecloth weighted to an arbitrary but equal pressure for an arbitrary but equal time for all specimens being compared.

Application of the tests described to the formulations of this example results in the following observations, clearly demonstrating the improved balance of minimum reflow temperature and maximum hardness qualities for the formulation containing the acrylic oligomer of Example 2 (20A).

| Formulation | 20A | 20B |
|---|---|---|
| Reflow temperature required | 250° F. | 285° F. |
| Knoop Hardness Number (77° F.) | 20.0 | 11.2 |
| Relative films softening at: | | |
| 120° F. | None | Light |
| 140° F. | None | Very Heavy |

EXAMPLE 21

Lacquers are prepared and evaluated according to the methods of Example 20 using, respectively, the oligomeric ethyl methacrylate of Example 8 (resulting in Formulation 21A) and the oligomeric methyl methacrylate of Example 2 (resulting in Formulation 21B) as modifiers for a coating resin. In the present example, the coating resin is a methyl methacrylate homopolymer of $\overline{Mw} \approx 100,000$. The following properties are obtained:

| Formulation | 21A | 21B |
|---|---|---|
| Reflow at 255° F. | Good | Good |
| Knoop Hardness Number (77° F.) | 18 | 19 |
| Relative film softening at: | | |
| 140° F. | None | None |
| 160° F. | Light | Moderate-Heavy |

EXAMPLE 22

The methyl methacrylate/butyl methacrylate co-oligomer of Example 13 and the conventional polyester plasticizer described in Example 20 are respectively formulated into lacquers designated 22A and 22B and are evaluated according to the methods of Example 20. The coating resin in this example is the methyl methacrylate homopolymer described in Example 21. Observed are the following:

| Formulation | 22A | 22B |
|---|---|---|
| Reflow at 285° F. | Good | Good |
| Knoop Hardness Number (77° F.) | 19.8 | 11.9 |
| Relative film softening at: | | |
| 120° F. | None | Light |
| 140° F. | Trace | Moderate-Heavy |

Examples 23 through 25 illustrate the utility of the novel compounds disclosed in Examples 1 through 19 in the formulation of coatings powders.

EXAMPLE 23

Rutile TiO$_2$ pigmented powders are obtained by grinding the solids resulting from evaporation of solvent from the following formulations. A TiO$_2$ dispersion is prepared according to the technique of Example 20. The resin used in this example, including the pigment dispersion, is a random copolymer of MMA/EA/MAA = 94.5/5/0.5 weight ratio with molecular weight $\overline{Mw} \approx 120,000$. The resin modifiers employed are the methyl methacrylate oligomer of Example 2 and the conventional polyester plasticizer described in Example 20.

| Formulation Modifier | 23A Oligomer of Example 2 | 23B Plasticizer of Example 20 | 23C None |
|---|---|---|---|
| (all parts for Examples are by weight) | | | |
| pigment dispersion | 85.7 | 85.7 | 85.7 |
| acrylic resin (predissolved in solvents below) | 55.7 | 55.7 | 95.7 |
| modifier | 40.0 | 40.0 | — |
| toluene | 83.6 | 83.6 | 83.6 |
| Cellosolve acetate | 92.1 | 92.1 | 92.1 |
| weight percent solids | 40 | 40 | 40 |
| pigment/binder weight ratio | 30/70 | 30/70 | 30/70 |
| weight percent modifier in binder | 40 | 40 | 0 |

The formulations are cast by drawdown blade such as to ultimately yield a two mil thick dry film, on glass plates to facilitate subsequent removal for grinding to powder, and on steel panels to provide film for characterization of physical properties. The castings are baked at 350° F. for 1 hour to remove solvent. Upon cooling, the film cast on glass is removed and ground with a Wiley Mill to pass a 20 mesh sieve. Small piles of the powders are placed on a metal sheet and heated for 30 minutes at increasing temperatures in 25° F. increments to ascertain the minimum temperature to effect fusion to a smooth and glossy film. Fresh powder is used for each test. Hardness qualities of the films are determined as described in Example 20.

Results obtained using the three formulations as given below and demonstrate the superior balance of minimum fluxing temperature and maximum film hardness at use temperatures with the oligomeric acrylic modifier.

| Formulation | 23A | 23B | 23C |
|---|---|---|---|
| Powder fluxing temperature (° F.) | 350–375 | 350 | >425 |
| Knoop Hardness No. (77° F.) | 20 | 6 | 21 |
| Relative film softening at: 140° F. | Trace | Moderate-Heavy | None |
| 160° F. | Light-Moderate | Heavy | None |

EXAMPLE 24

Formulations were prepared and powders isolated therefrom as described in Example 23, but without pigmentation and using, instead of the acrylic resin therein, a commercially available cellulose acetate butyrate resin with 37 percent butyryl content and 13.5 percent acetyl content (Eastman Chemicals EAB–38-1–2). The methyl methacrylate oligomer of Example 9, the polyester plasticizer described in Example 20, and a commercial monomeric phthalate ester plasticizer of molecular weight = 471 (Monsanto Santicizer 278) are used to modify the cellulosic resin as per the recipes:

| Formulation Modifier | 24A Oligomer of Example 9 | 24B Plasticizer of Example 20 | 24C Monomeric Phthalate Ester | 24D None |
|---|---|---|---|---|
| cellulosic resin (predissolved in solvents below) | 70 | 70 | 70 | 100 |
| modifier | 30 | 30 | 30 | — |
| toluene | 107 | | | 107 |
| cellosolve acetate | 63 | 63 | 63 | 63 |
| methylethyl ketone | 63 | 63 | 63 | 63 |

Evaluation of powder fluxing and film harndess characteristics as described in Example 23 yield the following comparisons.

| Formulation | 24A | 24B | 24C | 24D |
|---|---|---|---|---|
| Powder fluxing temperature (° F.) | 325 | 325 | 325 | 400 |
| Knoop Hardness Number (77° F.) | 12 | 4 | 5 | 8 |
| Relative film softening at 140° F. | Very Light | Light-Mod. | Light-Mod. | None |

The three modifiers are equally successful in reducing fluxing temperature but the acrylic oligomer does so with minimal sacrifice of film hardness qualities.

EXAMPLE 25

Lacquers are prepared and powders isolated therefrom as in Example 24, but the resin employed in the present example is of two components: (a) an acrylic random copolymer of composition MMA/n-BMA/MAA = 86/13/1 weight ratio and of molecular weight $\overline{M}w \approx 90,000$; and (b) a commercially available cellulose acetate butyrate resin having 50 percent butyryl content and 3 percent acetyl content (Eastman Chemicals EAB-531). The acrylic oligomer of Example 9 and the polyester plasticizer described in Example 20 are used as modifiers according to the formulations:

| | | Parts by Weight |
|---|---|---|
| acrylic resin | } predissolved in solvents below | 50.0 |
| cellulosic resin | | 25.0 |
| modifier | | 25.0 |
| toluene | | 243.0 |
| butanol | | 12.0 |
| methylethyl ketone | | 22.5 |
| Cellosolve acetate | | 22.5 |

Formulation 25A denotes the above with the modifier being acrylic oligomer of Example 9 and Formulation 25B where the modifier is the polyester described in Example 20.

Evaluation of powder fluxing characteristics and film hardness qualities as described in Example 23 yields the following comparisons:

| Formulation | 25A | 25B |
|---|---|---|
| Powder fluxing temperature (° F.) | 375 | 375–400 |
| Knoop Hardness Number (77° F.) | 15 | 7 |
| Relative softening at 140° F. | Trace | Moderate |

Not only does the formulation containing the novel oligomeric modifier exhibit markedly higher hardness, but it also possesses slightly lower fusion temperature.

As stated elsewhere herein, the terminology "thermoplastic resin" includes not only permanantly thermoplastic coating resins but resins which go through a thermoplastic phase and are flowable to form coatings which ultimately become thermoset.

We claim:
1. A mixture of:
A. A low molecular weight melt flow modifying oligomer consisting essentially of a vinyl oligomer having a number average chain length of about 4 to about 25 mers, a narrow molecular weight distribution such that the heterogeneity index is 2 or less, and the calculated $T_g$ is above 30° C., in which said oligomer is composed of one or more monomers selected from those of the formula:

wherein $R^1$ is H, alkyl, aminoalkyl, hydroxyalkyl, cycloalkyl, or aryl and R is H or methyl; and
B. A high molecular weight thermoplastic resin or blend of such resins selected from the group consisting of cellulose esters, nylons, epoxies, silicones, polysulfides, vinyl polymers, acetal polymers, polycarbonates, polysulfones, polyphenylene oxide, polyimides, polyxylylenes, chlorinated polyethers, alkyds, and polyesters A being present in a minor amount with relation to B.

2. The composition of claim 1 in which said heterogeneity index is less than 1.5, said calculated Tg is greater than 50° C., and wherein the number average chain length of the oligomer is from about 5 mers to about 15 mers.

3. The composition of claim 2 in which said oligomer is a homo-oligomer of an ester of acrylic acid or methacrylic acid with an alkanol, or a co-oligomer thereof with another vinyl compound.

4. The composition of claim 1 in which said oligomer is a homo-oligomer of an ester selected from methyl methacrylate, ethyl methacrylate, isopropyl methacrylate, tertiary butyl methacrylate, isobutyl methacrylate or tertiary butyl acrylate.

5. The composition of claim 1 in which the resin is a cellulose ester, or a vinyl polymer which is a polyacrylic resin having a weight average molecular weight of from 50,000 to 2,000,000 or blends thereof.

6. The composition of claim 5 in which said oligomer is of methyl methacrylate and said resin is cellulose acetate butyrate, polymethylmethacrylate, or blends thereof.

7. A lacquer containing an organic solvent and the composition of claim 1 in solution therein.

8. The composition of claim 1 in the form of a powder.

9. A lacquer containing an organic solvent and the composition of claim 6 in solution therein.

10. The composition of claim 6 in powder form.

11. In a method of coating an article, the steps of applying a film of the composition of claim 7 to an article and curing the same.

12. In a method of coating an article, the steps of applying a film of the composition of claim 8 to an article and curing the same.

13. In a method of coating an article, the steps of applying a film of the composition of claim 9 to an article and curing the same.

14. In a method of coating an article, the steps of applying a film of the composition of claim 10 to an article and curing the same.

15. A dispersion of particles of the composition of claim 1 in an aqueous or organic liquid.

16. A dispersion of particles of the composition of claim 6 in an aqueous or organic liquid.

17. In a method of coating an article, the steps of applying a film of the composition of claim 15 to an article and curing the same.

18. In a method of coating an article, the steps of applying a film of the composition of claim 16 to an article and curing the same.

19. A mixture of:
A. A low molecular weight melt flow modifying oligomer consisting essentially of a vinyl oligomer having a number average chain length of about 4 to about 25 mers, a narrow molecular weight distribution such that the heterogeneity index is 2 or less, and the calculated $T_g$ is above 30° C., in which said oligomer is composed of one or more monomers selected from those of the formula:

$$H_2C=C(R)-C(=O)-OR^1$$

wherein $R^1$ is H, alkyl, aminoalkyl, hydroxyalkyl, cycloalkyl, or aryl and R is H or methyl, the monomers where R is methyl being present in at least major proportion, and B. A high molecular weight thermoplastic resin or blend of such resins, A being present in minor amount with relation to B.

20. The composition of claim 19 in which the oligomer is composed, in major proportion, of alkyl, of 1 to 4 carbon atoms, methacrylates.

* * * * *